A. N. Browne,

Lamp Burner.

No. 4058. Reissued July 5. 1870.

Witness

Chas. H. Smith

Geo. T. Purchase

Abraham Curtis

Wm. D. Fuller

Mary A. Van Allen

United States Patent Office.

ABRAHAM BURTIS AND MARY A. VAN ALEN, OF BROOKLYN, AND WILLIAM D. LUDLOW, OF NEW YORK, N. Y. ASSIGNEES OF A. W. BROWNE.

*Letters Patent No.* 74,793, *dated February* 25, 1868; *reissue No.* 4,058, *dated July* 5, 1870.

IMPROVEMENT IN LAMP-BURNERS.

The Schedule referred to in these Letters Patent and making part of the same.

*To all whom it may concern:*

Be it known that ARTHUR W. BROWNE, of Brooklyn, in the county of Kings and State of New York, did invent an Improvement in Lamp-Burners; and the following is declared to be a correct description of the same.

This invention relates to Argand burners, in which the wicks employed are flat, and the air to the inner draught is introduced laterally. A wick-tube is made in such a manner that two thicknesses of wick pass through that portion of the wick-tube where the wick-raising mechanism is applied, and then said wick-tube spreads, and the air for the central air-tube is brought in laterally, and the top of the tube is circular, to form an Argand flame.

In the drawing—

A represents the lower screw-threaded part of the lamp-burner, which is to be screwed into the cap or top of the reservoir of an ordinary lamp.

Figure 1:
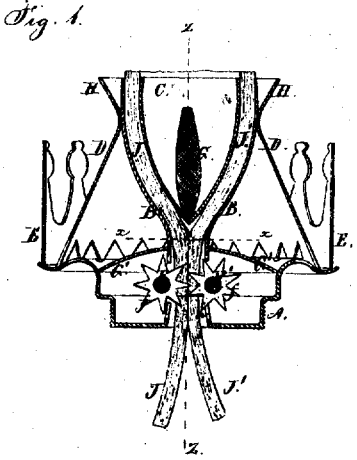
Figure 1 is a vertical section of a lamp-burner, illustrating the invention, the plane of section being indicated by the line *y y*, fig. 2.

The part A is slotted, as shown at *a*, fig. 1, to receive the lower end of the wick-tube B, which may be fastened to said part A by bending the slit portions of said tube under the edges of the slot *a*.

The form of the tube B will be understood by reference to fig. 1. The lower end of said tube is oblong, and rectangular in its horizontal section. Proceeding upward the tube B gradually flares outward, and terminates at its upper end in the form of a cylinder.

C is a tube placed within the upper portion of the tube B.

The two opposite sides of the tube C, at its lower end, are made to converge toward the bottom, thus giving the lower end of the tube a V-form analogous to a wedge, while the upper portion of said tube C is cylindrical, and concentric with the cylindrical portion of the tube B.

Figure 2:
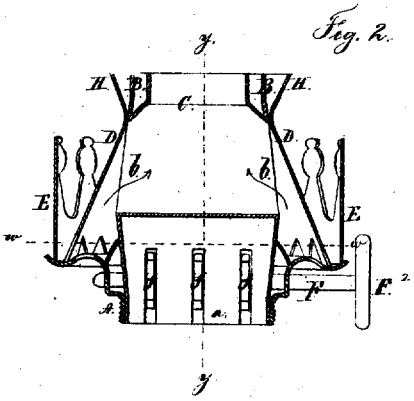
Figure 2 is a similar view, the section being in the plane by the line *z z*, fig. 1.
Figure 3:
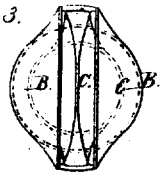
Figure 3 is an under-side view of the two tubular metallic shells forming the wick-tube, this view being the same as a horizontal section at *x x*, looking upward.
Figure 4:
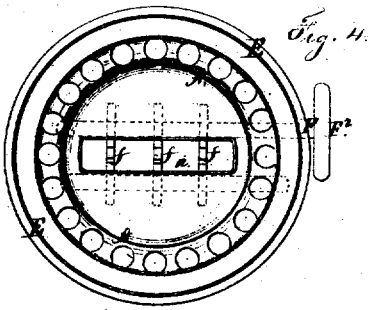
Figure 4 is a horizontal section on the line *w w*.

The top of the tube C is flush, or nearly so, with the tube B, and the tube C is held in position by means of the vertical stays *b b*. These stays *b b* are hollow, and, corresponding slots being cut in the tubes B and C, the external air is permitted to pass laterally, as indicated by the arrows in fig. 2.

D is a conical jacket, constituting the outer shell of the burner, and made fast at top to the tube B.

E is a lamp-chimney supporter outside the jacket or cone D.

F $F^1$ are shafts, bearing each a set of toothed wheels, *f f f*. The wheels on one shaft may mesh or gear with those on the other.

A milled disk, $F^2$, on the shaft F, enables all the wheels *f* to be put in motion simultaneously.

The openings which conduct air through the hollow stays *b b* may be covered with wire-gauze, as shown at G, so as to prevent the communication of fire or flame in C to the gases or vaporized oil which may be diffused in the space between the jacket D and tube B, and thus avoid danger of exploding the oil in the reservoir.

In like manner, in order to prevent the communication of fire, by the spontaneous ignition of the diffused gases, to the gas or vaporized oil in the chambered part A, and thence to the oil in the reservoir through the slots for the ratchet-wheels *f*, the said part A may be closed or covered with a gauze, at G'.

The two wicks J J' are introduced into the lower flattened portion of the tube B, and, both being caught between the wick-raisers, are elevated simultaneously by the rotation of the latter.

The upper ends of the wicks are deflected by the wedge-shaped lower end of the tube C, so as to rise at the opposite sides of said tube, in doing which they are spread and curved till they ultimately assume a circular form in the annular orifice between the upper part of B and C of the wick-tube.

The wicks being projected sufficiently above the wick-tubes, and lighted, produce a round, hollow, or Argand flame, to the internal surface of which air is supplied through C, as above explained. Suitable openings in the lamp-chimney supporter, and at the lower end of the jacket D, afford free upward draught for the supply of air to the external surface of the flame.

The wire-gauze G not only serves as a guard against explosion, but prevents sudden rushing of the air upon the flame during atmospheric vibrations or undue draughts. Each of the tubes B and C is shaped or swaged out of sheet metal.

H is a flange, secured to and extending round the upper part of the tube B, so as to deflect the air externally supplied in an outward direction. This outward deflection of the air has a tendency to create a vacuum, and spread the flame so as to enlarge it.

We are aware that double elevating wheels have before been used upon both sides of a single wick, so as to compress the single wick between them.

What we claim, as the invention of the said A. W. BROWNE, is—

1. An Argand burner having an interior air-tube with a V-shaped lower portion, into which the air is admitted laterally, in combination with the exterior casing or wick-tube, substantially as specified.

2. A wick-tube constructed to receive the two thicknesses of wick at the ratchets or wick-raisers, and spread the same into a circular (or Argand) form at the flame, substantially as specified.

3. An Argand lamp-burner adapted to receiving two flat wicks, in combination with the wick-raisers, upon spindles or shafts outside of the wicks, and operating upon the wicks, substantially as set forth.

4. The cone D, connected, at or near its upper end, to the Argand burner, substantially as specified.

5. The double wick-raising wheels, made with penetrating points that interlock within or between the two thicknesses of wicks in the wick-tube of an Argand burner, substantially as specified.

6. The gauze G, in combination with the wick-tube C D, substantially as specified.

Signed by us this 7th day of June, A. D. 1870.

ABRAHAM BURTIS.
WM. D. LUDLOW.
MARY A. VAN ALEN.

Witnesses:
CHAS. H. SMITH,
GEO. T. PINCKNEY.